United States Patent [19]

Chan et al.

[11] Patent Number: 4,893,254

[45] Date of Patent: Jan. 9, 1990

[54] MANIPULATOR ARM POSITION SENSING

[75] Inventors: Stephen K. C. Chan; Peter D. Lawrence, both of Vancouver, Canada

[73] Assignee: University of British Columbia, Vancouver, Canada

[21] Appl. No.: 184,107

[22] Filed: Apr. 20, 1988

[51] Int. Cl.⁴ .............................................. G05B 19/18
[52] U.S. Cl. ........................................ 364/513; 901/9; 901/15
[58] Field of Search ........... 364/513, 167.01, 191–193; 318/568; 901/2, 3, 9, 15

[56] References Cited

U.S. PATENT DOCUMENTS 4,763,276  8/1988  Perreirra et al. ................... 364/513

Primary Examiner—Allen MacDonald
Attorney, Agent, or Firm—C. A. Rowley

[57] ABSTRACT

A method of controlling the movement of an articulated arm to permit the arm to move an end point thereof more freely and more directly to a preselected target. This smoother operation is obtained by a computer calculating the change in joint angle using an iterative pseudo inverse Jacobian having a damping factor. The damping factor is adjusted for each iteration based on the distance necessary to reach said preselected target.

7 Claims, 5 Drawing Sheets

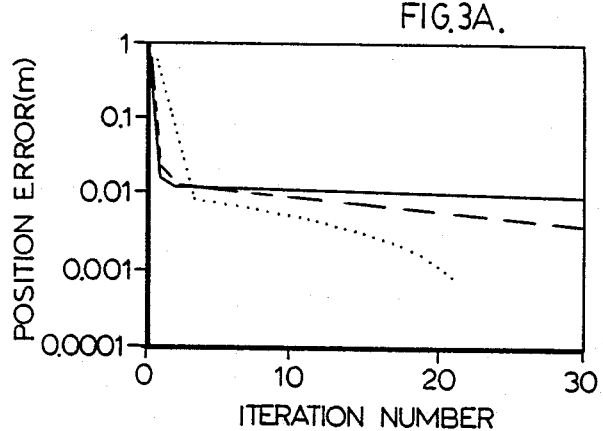
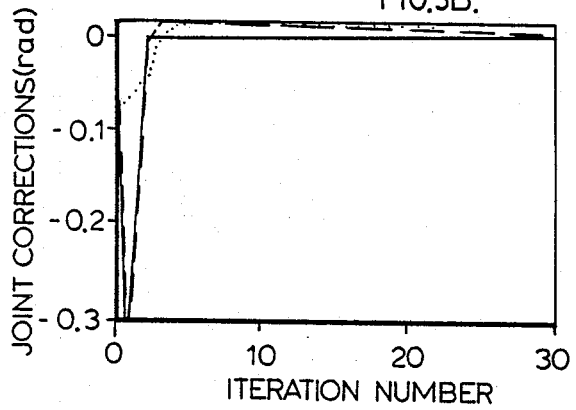
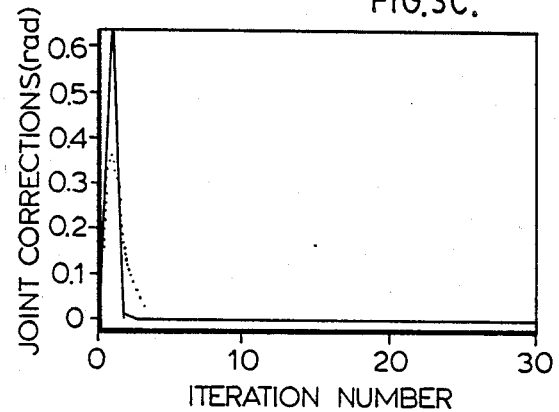

MANIPULATOR ARM POSITION SENSING

FIELD OF THE INVENTION

The present invention relates to articulated arm control. More particularly the present invention relates a control system to more smoothly operate or move an articulated arm based on applying a variable damping factor to the pseudoinverse Jacobian solution determining the change in joint angles for each joint of the articulated arm with the damping factor being varied based on the distance to the selected target.

BACKGROUND TO THE PRESENT INVENTION

Generally when controlling an articulated arm using a hand control or any other type of control a command is fed to the control computer directing that the arm be moved in a particular manner i.e. a particular distance at a particular velocity in a particular direction. Obviously these commands are to cause a selected end point on the arm to move toward a selected target. Thus normally the input to the control is to move the end point of the arm a specified distance (in a selected time period) in a selected direction. These instructions must be modified as the arm is moved by adjusting the angles at each of the joints and it is necessary to determine the joint angles for each of the articulated joints that are to be adjusted to obtain the movement.

The term jointspace is normally used to define the range of angular positions of each joint and workspace defines the range of positions of the selected end point of the arm in space.

The transformation from jointspace to workspace is simple. A set of closed-form equations can be easily derived for the forward kinematics transformations.

$$p = f(\theta) \tag{1}$$

Where
p=workspace vector
$\theta$=jointspace vector

A general method for deriving the forward kinematic transformation is well known. An accurate transformation is required from workspace to jointspace, the inverse kinematics transformation, is required for control of the manipulator or articulated arm.

$$\theta = f^{-1}(p) \tag{2}$$

Simple closed-form inverse kinematics equations are possible only for a limited number of arm designs and are accurate only away from a singularity i.e. in a high manipulability region of the workspace. Singularities or singular points are boundaries between alternative joint solutions for a given target position and generally, adjacent to a singularity there are several solutions close together.

In substantially all applications the conversion from workspace to jointspace must be made efficiently to permit real time operation of the controlled arm or manipulator.

One well known method of solving inverse kinematics problems is to use an iterative method based on the Jacobian matrix. An iteration scheme can be applied to estimate the jointspace values required to position the manipulator at a point in the workspace (target). In these solutions important considerations are the starting jointspace values and the direction and magnitude of the joint corrections.

The Jacobian is a liner relationship between different changes in jointspace and different changes in workspace $$J(\theta)\delta\theta = \delta p \tag{3}$$

where:

$$J(\theta) = \delta f(\theta)/\delta \theta \tag{4}$$

General methods are known for calculating the Jacobian matrix for an arbitrary manipulator and this Jacobian matrix is inverted to convert differential changes in workspace to changes in jointspace.

The set of equations (3) can also be solved using Gaussian elimination to obtain the joint corrections.

The Jacobian usually gives a good estimate of joint corrections required to minimize errors in the workspace, however difficulties areise when the manipulator is near a singularity or when the Jacobian matrix is not square.

The inversion of a Jacobian matrix is not possible at a singular point as the determinant of the Jacobian is zero at this point. Near singularities small changes in the workspace require physically large joint changes and the joint corrections determined by the inverse Jacobian become extremely large and incorporate large errors. In other words the use of Jacobian algorithms near singular points results in significant instability of the arm.

Attempts to overcome this problem have involved the use of the pseudoinverse of the Jacobian matrix. The pseudoinverse is particularly useful where the Jacobian matrix is not square. A general pseudoinverse is given by the formula:

$$J^+(\theta) = (J^T(\theta)J(\theta))^{-1}J^T(\theta) \tag{5}$$

In the case where the rank of the Jacobian is less than the number of degrees of freedom of the end effector in the particular arm being manipulated the solution of equation (3) minimizes the error in the solution in the least squares sense.

$$\|J(\theta)\delta\theta - \delta p\| \tag{6}$$

The pseudoinverse does not have to be derived explicitly. The set of equations given by:

$$(J^T(\theta)J(\theta))\delta\theta = J^T(\theta)\,\delta p \tag{7}$$

can be solved for $\delta O$ with fewer operations using Gaussian elimination.

If the Jacobian matrix is symmetric the number of operations required to calculate may be reduced for example an n X n Jacobian using one method (Wampler's described below) $J^T(\theta)J(\theta)$ requires $(n^3+n^2)/2$ multiplications and $(n^3-n^2)/2$ additions. The multiplication of the position errors by the transpose of the Jacobian requires $n^2$ multiplications and $(n^2-n)$ additions. In the case of a 6 degree of freedom manipulator about 162 manipulations and 120 additions are required to set up the equation.

For redundant manipulators it has been suggested to use an alternative formulation with a reduced number of calculations for the pseudoinverse, $J^+(\theta)$ of the matrix $J(\theta)$.

$$J^+(\theta) = J^T(\theta)(J(\theta)J^T(\theta))^{-1} \qquad (8)$$

As above indicated the pseudoinverse does not exist if the determinate of $J(O)J^T(\theta)$ is zero which renders the system ineffective at singular points.

A number of algorithms using pseudoinverse techniques for redundant and non redundant manipulators have been tested to solve the inverse kinematics of multi-jointed manipulators (up to about 7 joints), however these solutions did not suggest how to handle problems near or at a singularity.

It has also been suggested to iteratively vary the magnitude of the joint correction obtained using the pseudoinverse if the joint correction did not move the manipulator closer to the target and using another level of iteration to solve for the correct magnitude of joint correction. However these solutions are not sufficiently efficient for real time implementation and furthermore the assumption that the direction is correct may not be valid for a singularity since the Jacobian changes greatly with small changes in jointspace.

Another teaching as described by C. W. Wampler II in "Manipulator Inverse Kinematic Solutions Based on Vector Formulations and Damped Least Squares Method", IEEE Transactions on Systems, Man, and Cybernetics, Vol. SMC-16, No. 1, January/February 1986, p 93–101 stabilizes the jointspace calculations near singular points by damping the differential joint changes as indicated by the following:

$$\begin{bmatrix} J(\theta) \\ KI \end{bmatrix} \delta\theta = \begin{bmatrix} \delta P \\ 0 \end{bmatrix} \qquad (9)$$

where:
I = identity matrix
K = square root of the damping factor k
The pseudoinverse of this over defined set of equations has a constant factor k added to the diagonal elements of the square product matrix.

$$J^+(\theta) = (J^T(\theta)J(\theta) + kI)^{-1}J^T(\theta) \qquad (10)$$

This modification of the pseudoinverse results in a positive defined matrix that is guaranteed to be invertible.

Wampler also suggested that a fixed damping factor be used and that this damping constant be chosen to insure stability at or adjacent to singular points and for out of reach targets. This damping poses limits to the size of the errors as well as the size of the solution. Damping is equivalent to minimizing the following function.

$$\| J(\theta)\delta\theta - \delta p \|^2 + k \| \delta\theta \|^2 \qquad (11)$$

Near singularities the damping factor causes the singular value of the pseudoinverse to go towards zero instead of toward infinity. With damping the joint corrections are kept to finite values, however, there is a compromise between stability and the error in solving for the joint corrections in equations (3). For stability the damping value is chosen for operation of the manipulator near a singular point, however at a distance away from the singular point this damping factor is not effective.

Wampler chose a large damping factor to give stability by driving the joint corrections to zero for out of reach targets, however with a large damping constant the manipulator is unable to reach positions close to the singular points, joint corrections go to zero too quickly (for target positions which are close to singular points) for the manipulator to reach those targets. The fixed damping constant is also inefficient for targets near singular points because the joint corrections are very small and convergence to the solution is very slow.

It has been proposed to overcome this problem by the use of a variable damping technique which provides a compromise between the size of the error in equation (6) and obtaining feasible joint corrections (see Y. Nakamura, "Kinematic Studies on the Trajectory Control of Robotic Manipulators", Ph.D thesis Automation Research Laboratory, Kyoto University, June 1986.) This modified pseudoinverse is described in the art as a singular robust inverse or SR-inverse. At positions far away from singularities no damping is needed, as the manipulator nears a singular point more damping is applied. The manipulability of the manipulator is calculated to determine it's closeness to a singular point. The amount of computation required to determine nearness to a singular point can be very large. The method using estimation of the manipulability would require in the order of $n^3$ operations where n is the number of degrees of freedom of the manipulator.

As with the fixed damping method the SR-inverse has relatively large damping values close to singular points, thus motion near singular points would be restricted.

Near singularities in the error in the SR techniques is still very large. With the variable damping scheme the stability for unreachable positions which is possible using a fixed damping technique is lost if a low damping value is used as is normally the case in the high manipulability region. The use of the variable damping factor is to insure the pseudoinverse is invertible, yet not inhibit operation away from singular points. Accuracy is not possible for positions near singular points.

BRIEF DESCRIPTION OF THE PRESENT INVENTION

It is an object of the present invention to provide a control system for an articulated arm that is effective both near singularities and in the high manipulability region.

Broadly the present invention relates to a method of controlling the movement of an articulated arm comprising applying a command to a control computer to define a target for an end point of the arm, applying an iterative pseudoinverse Jacobian having a damping factor for defining the amount of change for each joint of said arm, adjusting the magnitude of the damping factor for each iteration in accordace with the distance from the end point to the target, adjusting the angles of said joints of said arm in accordance with the angles determined using a number of iterations in the range of 1 to 20.

Preferably the joint angles will be adjusted after each iteration.

The damping factor preferably will be adjusted in accordance with the formula;

$$k_3 = k \| \delta p \|^x \qquad (12)$$

where:
$k_3$ = the adjusted damping factor k=a selected constant in the range of (0.001 to 1) times the total length of the articulated arm in meters.

$\|\delta p\|$ =the distance between the end point and target after each iteration x=is a preselected number between 1 and 3.

More particularly the present invention relates to a method of controlling the operation of an articulated arm to improve the operation of the arm adjacent to singularities or in regions of high manipulability which comprises applying a command to a computer control to move an end point on said articulated arm a selected distance in a selected direction in a time to move to a target and wherein the arm has joint angles that are adjustable and must be changed to obtain the desired movement, determining the joint angles for said joints to move said end point toward said target using an iterative solution based on a pseudoinverse Jacobian matrix in accordance with the formula;

$$J^+(\theta)=(J^T(\theta)J(\theta)+k_3 I)^{-1} J^T(\theta) \tag{13}$$

where
I = the identity matrix
$k_3$ = a variable damping factor determined by the equation $$k_3 = k \|\delta p\|^x \tag{12}$$

where:
k = a preselected number selected in the range of 0.001 to 1 times the total length of the arm in meters
$\|\delta p\|$ = the distance between the end point and the target after each iteration
x = a number selected between 1 and 3, adjusting the value of $k_3$ for each iteration, and adjusting the joint angles to move the arm toward the target after a number of iterations in the range of 1 to 20.

Preferably the joint angles will be adjusted to move the arm toward the target after each iteration and preferably x=2.

BRIEF DESCRIPTION OF THE DRAWINGS

Further features, objects and advantageous will be evident from the following detailed description of the preferred embodiments of the present invention taken in conjunction with the accompanying drawings in which;

FIGS. 3A–6C are graphis comparing the operation of the present invention with other iterative pseudoinverse Jacobian techniques incorporating damping factors.

PREFERRED EMBODIMENTS OF THE PRESENT INVENTION

Figure 1:
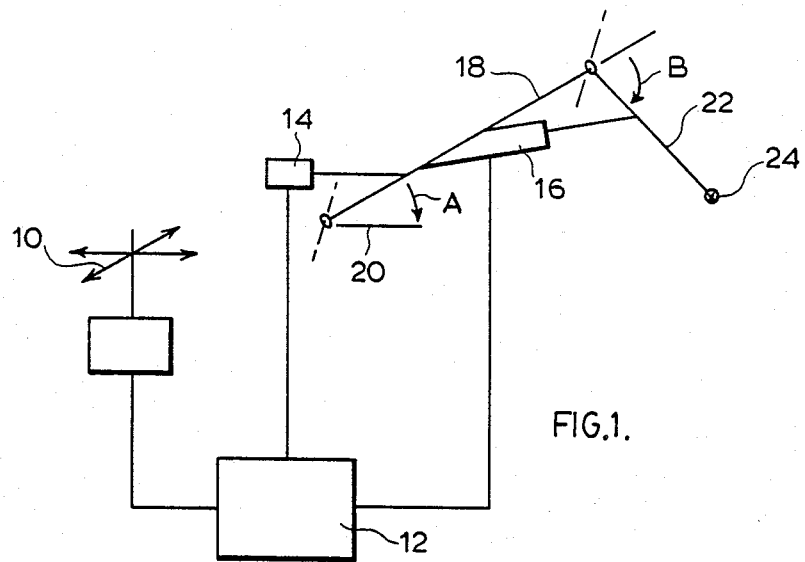
FIG. 1 is a schematic illustration of a simple articulated arm that may be controlled by the present invention.

Generally when operating a manipulator such as an articulated arm a joy stick or the like such as the joystick illustrated at 10 in FIG. 1 is manipulated to provide a control signal to a computer 12 which controls the angular displacement of the joints of the arm. In the illustrated arrangement the computer 12 controls the actuating members 14 and 16 which adjust the angles A and B respectively. The angle A is the angle between a first arm segment 18 and a datum line 20 and the angle B is the angle between the projection of the longitudinal axis of the arm segment 18 and the longitudinal axis of the arm segment 22.

The movement of the joystick 10 defines the location of a target to which the end point 24 at the free end of the arm segment 22 is to be moved.

Of course it is also possible for workspace position control signals to be computer generated by a robot path planning system rather than control stick generated.

Figure 2:
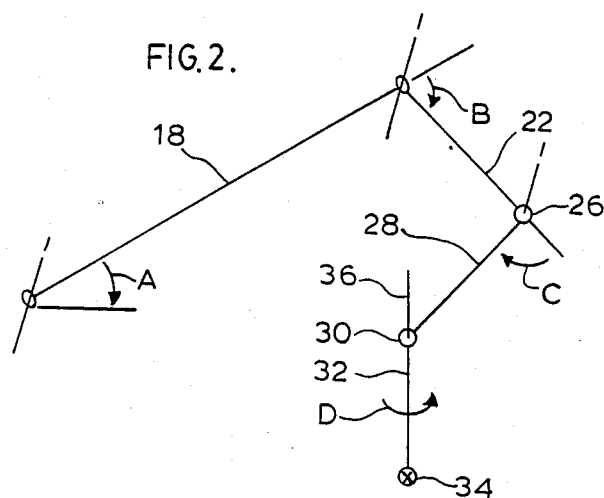
FIG. 2 shows a more elaborate arrangement incorporating more degrees of freedom and that may be controlled using the invention.

If desired further degrees of freedom in an arm incorporating the present invention may be provided by adding further joint and end effector or arm segments such as the joint 26 and arm segment 28 and joint 30 and arm segment 32 as shown in FIG. 2. With this arrangement the end point of the articulated arm is indicated at 34 and is positioned at the free end of the extended arm segment 32. In this case further angles C and D are also controlled to adjust the angle between the arm segments 22 and 28 and the rotation of the arm segment 32 around the axis 36 of joint 30. The actuators for adjusting these angles have not been shown in FIG. 2, however any suitable actuator may be used.

For the purposes of illustrating and describing the present invention the simpler arrangement shown in FIG. 1 will be used as the example.

The error between the initial position and the target position as set by the joystick 10 can be specified either in jointspace or in workspace. The error in workspace is set by the joystick and it has a rough correspondence to the magnitude of the error in the jointspace. The error being the amount the arm must move or the joint angle must reach to reach the target set by the joystick.

With the present invention the pseudoinverse is used to determine the joint angle $\theta$ for each joint angle in accordance with the following formula;

$$J^+(\theta)=(J^T(\theta)J(\theta)+k_3 I)^{-1} J^T(\theta) \tag{13}$$

$$\delta\theta = J^+(\theta)\delta p$$

With the present invention the damping factor is modified in accordance with the magnitude of the workspace error between the end point and the target positions for each iteration of the pseudoinverse. Thus the damping factor for the error damped pseudoinverse (EDP) varies according to the following formula;

$$k_3 = k \|\delta p\|^x \tag{12}$$

where
$k_3$ = the adjusted damping factor
k = a selected constant in the range of (0.001 to 1) times the total length of the articulated arm in meters
$\|\delta p\|$ = the distance between the end point and the target after each iteration
x = a preselected number between 1 and 3

Generally the values for k and x will be determined by sample calculations for any selected arm to obtain the most desireable output. For a simple two segment arm values of k=1 and x=2 have been found very satisfactory for an arm of 2 meters length. Generally the value of k will be lower the greater the complexity of the arm. A low value for x of say 1 would be useable with arms of 2 or 3 arm segments but normally x will be higher particularly for more complex arms. A high value of x for example 3 may in some cases result in overshooting by the arm or oscillation of the arm and thus a value for x of about 2 is prefered.

As is discussed above, the Jacobian usually gives a very good estimate of the required correction when the joint changes are small and for very, very small joint changes is even adequate near singularities. However when the required joint changes are large, joint corrections must be conservative to avoid overshoot and oscillations in reaching the target point. Thus when joint changes are very small the conventional Jacobian appears to operate satisfactory, but in many cases the joystick is manipulated to result in relatively large workspace changes which in turn require, in most cases, large jointspace changes. Thus it is necessary when the joint change is to be large, as above indicated, to be more conservative in the joint change to avoid overshoot and oscillations as would occur when using the inverse Jacobian strategy alone. This is even more important near singular points where even small joint or workspace changes could result in large joint corrections using the inverse Jacobian alone. This problem is alleviated by the use of damping.

When following the above teaching and modifying the damping factor in accordance with or as a function of the distance between, or correction necessary between, the end point location and the target location causes the damping factor to vary based on the work space error i.e. the damping factor varies directly with the work space error and is larger with larger work space error regardless of whether the location of the target is in the high manipulability region or near a singularity.

Changing the damping value near a singularity in accordance with the distance from the end point to the target decreases the damping value as the work space error reduces, thereby increasing the convergence rate and insures that the end point reaches the target with a minimum of oscillation while maintaining a minimum damping value at the singularity to insure invertability.

In the high manipulability region the pseudoinverse gives a good estimate of the required joint changes if as above indicated the joint changes are small. For large joint changes or workspace changes the pseudoinverse will give very large joint corrections which will lead to overshooting the target and oscillation of the manipulator. With the present invention the overshoot is reduced and most cases eliminated with large workspace changes in the high manipulability region by changing the damping value in accordance with the workspace change required i.e. distance between the end point and the target as set by the joystick.

To reiterate with respect to target points adjacent to singularities, such targets are reachable within a specified tolerance, the joint corrections do not go to zero too quickly near singular targets because the damping factor decreases as the manipulator moves closer to the target. In some cases when a singularity is approached closely difficulties may be encountered as the boundaries between alternate joint solutions for a given target solution are close and several solutions may be exist close together near singular points and the manipulator may tend to move from one solution to another.

To improve the operation close to a singularity it may be desireable to artificially move the starting position or initial estimate of the jointspace values away from the singularity a distance such that the present solution is closer in jointspace than an alternative solution.

Another method may be simply to immobilize certain joints which have reached their joint limits. Joint corrections for the immobilized joint would be equal zero if the column of the Jacobian matrix corresponding to that joint is set to zero. The contributions of that particular joint to eliminating the position error would then be zero.

In any event utilizing the present invention of an error damped pseudoinverse will lead the arm to the desired destination more quickly and with less oscillation.

Even in the unreachable region i.e. beyond the reach of the arm wherein the manipulator simply positions itself to minimize the position error the use of the error damped pseudoinverse of the present invention significantly improves the operation since the arm will point to the unreachable position.

The actual correction of arm position i.e. actuation of the actuators 14 and 16 will preferably, when practicing the present invention, occur immediately after each iteration. This is practical with the present invention since even with large corrections the modified damping factor limits the error and leads the arm more directly to the target. It will also be apparent that if desired the results of a number of iterations may be accumulated say up to 20 iterations before movement of the actuators is triggered.

The following examples illustrate the operation of the present invention in comparison with pseudoinverses incorporating either a fixed damping coefficient as indicated by the curves $k_1$ (Wampler) or a variable damping coefficient as indicated by the curves $k_2$ (Nakamura) or the present invention as indicated by $k_3$. In all of the graphs $k_1$ is a solid line $k_2$ is represented by a dashed line and $k_3$ by a dotted line.

The fixed damping value was set at 0.2. A two linked arm with each link of 1 meter length was used. For the variable damping factor the damping coefficient was set 0.01 and the damping factor k was determined based on the manipulability of the manipulator at the particular location as determined by the formula;

$$m = \text{sqrt } [\det(J^T(\theta)J(\theta))] \tag{14}$$

and $k_2$ was calculated on the basis of $$k_2 = k_4(1 - m/m_o)^2 \tag{15}$$

where: $k_4$ = a constant damping factor with damping being applied only when the manipulability is less than 1.

When practicing the present invention in the examples the damping coefficient k was set at 1.

In FIGS. 3 to 6 the alphabetical designations represent:

1. "A" represents Distance Error;
2. "B" represents corrections for the first joint; and
3. "C" represents corrections for the second joint.

Figure 6A:
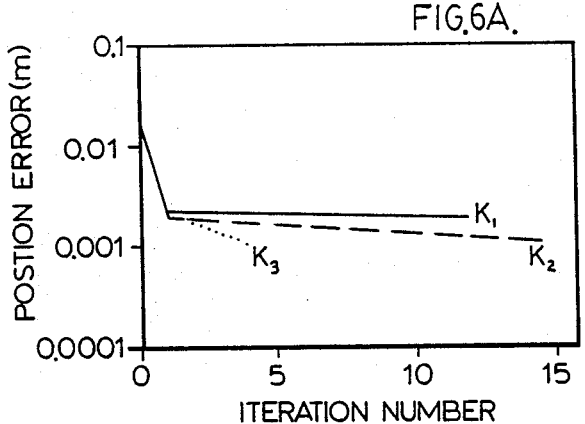
Figure 6B:
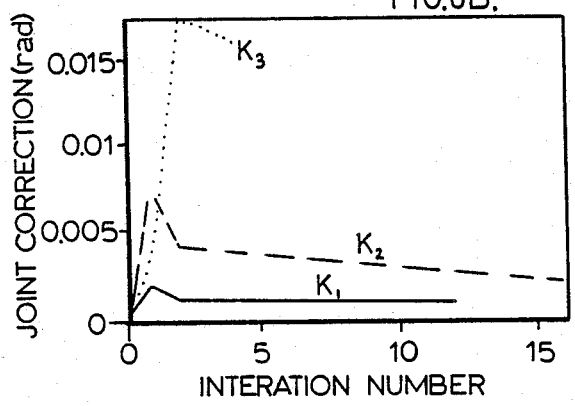
Figure 6C:
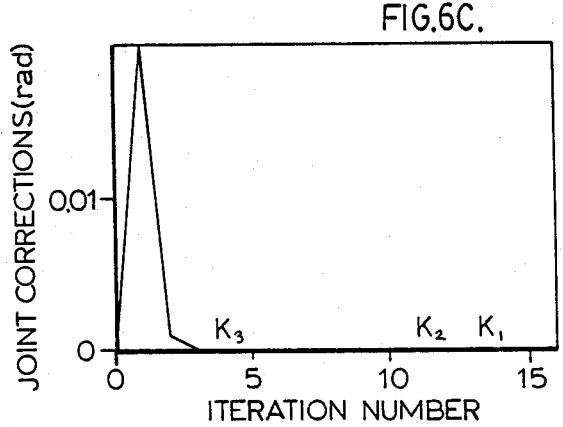

FIGS. 3 and 6 are examples of respectively large and small joint changes around a singular point at the base of the manipulator.

Figure 4A:
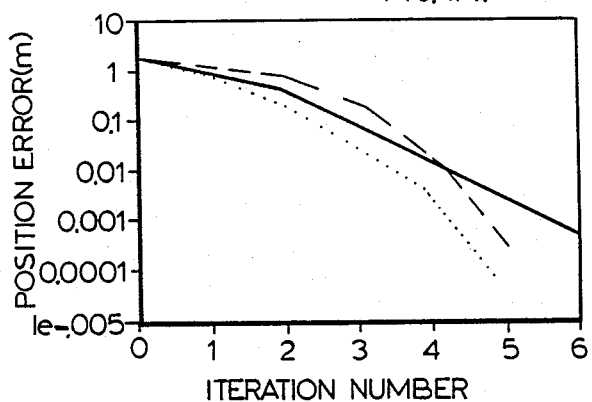
Figure 4B:
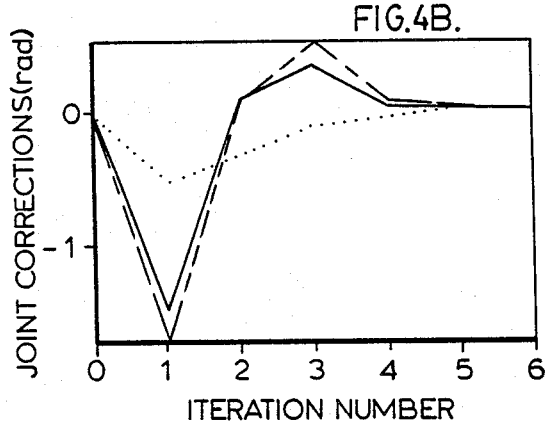
Figure 4C:
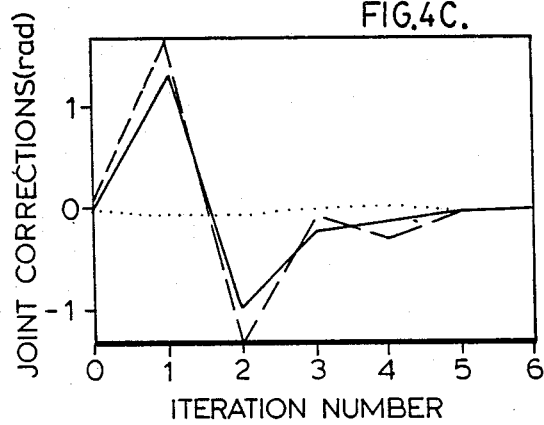
Figure 5A:
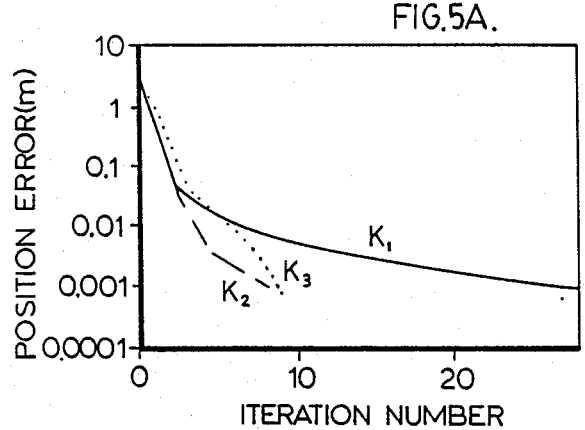
Figure 5B:
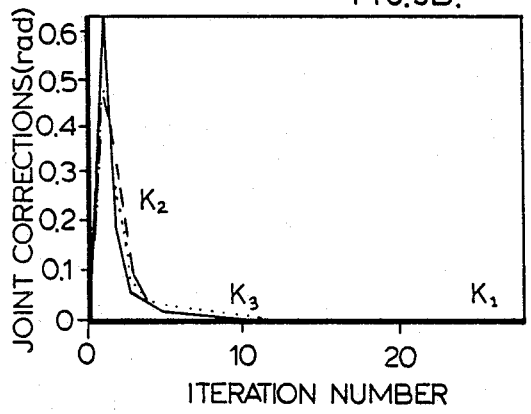
Figure 5C:
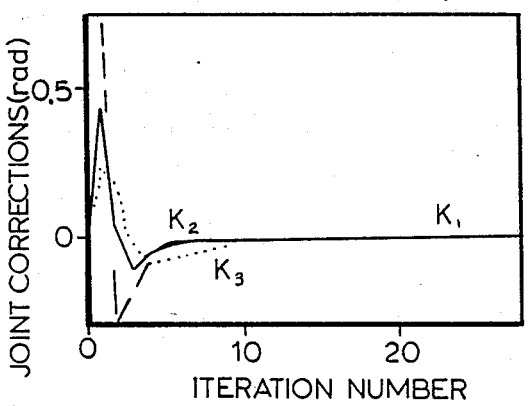

FIG. 4 illustrates a large joint change in the high manipulability region and FIG. 5 shows large joint changes near an extended elbow singularity.

It will be apparent from FIG. 3 that with a large joint change the distance error is reduced more quickly when following the present invention, yet the other systems work quite well. On the other hand, in fact in all conditions shown, the position error (when following the present invention, always reduces to the lowest value. Similarly in all these examples the number of iterations for each angle is the least when practicing the present invention regardless of the position and magnitude of the joint change.

It is belived that the present invention provides a means for the manipulator end point to converge to targets near singular points and provides a method requiring very little computational overhead in addition to that required for the simple pseudoinverse. Generally the present invention will result in convergence in all locations i.e. adjacent singularities or in the high manipulability regions in the same number or less iterations than the prior art techniques. As above indicated because of the error dampled pseudoinverse's ability to move very closely to singular points it is possible for the manipulator to move into alternative solutions and in these types of manipulators suitable precautions should be taken to bias the pseudoinverse to one solution.

It will be apparent that the present invention generally gives a good approximation on the first iteration and the fact that the error damped pseudoinverse limits changes by changing the damping factor it is appropriate to activate the actuators after each iteration when practicing the present invention.

Having described the invention modifications may be made without departing from the spirit of the invention as defined in the appended claims.

We claim:

1. A method of controlling the movement of an articulated arm comprising applying command to a control computer to define a target position for an end point of said articulated arm, applying an iterative pseudoinverse Jacobian having a damping factor for defining the amount of change of each joint angle for each joint to be actuated of said arm, changing the magnitude of said damping factor for each iteration in accordance with the calculated workspace distance between the end point and the target position so that said damping factor increases with an increase in said distance, adjusting the angles of said joints of said arms in accordance with angles determined using a number of iterations in the range of 1 to 20.

2. A method as defined in claim 1 wherein said joint angles are adjusted after each iteration.

3. A method as defined in claim 1 wherein said damping factor is adjusted in accordance with the formula;

$$k_3 = k \| \delta p \|^x \quad (12)$$

where
- $k_3$ = the adjusted damping factor
- $k$ = a selected constant in the range of 0.001 to 1 times the total length of the articulated arm in meters
- $\| \delta p \|$ = the distance between the end point and target positions after each iteration
- $x$ = a preselected number between 1 and 3.

4. A method as defined in claim 3 wherein x is 2.

5. A method of controlling the operation of an articulated arm to improve the operation of the arm adjacent singularities and in regions of high manipulability, said arm having arm segments pivotally interconnected by articulated joints forming adjustable joint angles between arm segments and actuators for changing said joint angles to move said arm, comprising applying a command to a computer control to define a target position for an end point on said arm, said computer determining the joint angles for said joints required to move said end point toward said target position using an iterative solution based on a pseudoinverse Jacobian matrix in accordance with the formula $$J^+(\theta) = (J^T(\theta)J(\theta) + k_3 I)^{-1} J^T(\theta) \quad (13)$$

where
- $I$ = identity matrix
- $k_3$ = variable damping factor determined from the equation $$k_3 = k \| \delta p \|^x \quad (12)$$

where
- $k$ = a preselected number in the range of 0.001 to 1 times the total length of the arm in meters
- $\| \delta p \|$ = the distance between the end point and target position after each iteration
- $x$ = a number selected between 1 and 3 adjusting the value of $k_3$ for each iteration based on the calculated position of the end point relative to the target position and said computer actuating said actuators for adjusting the joint angles to move said end point on said arm toward said target position after a number of iterations in the range of 1 to 20.

6. A method as defined in claim 5 wherein x is 2.

7. A method as defined in claim 5 wherein said actuators are actuated by said computer to adjust said joint angles to move said end point on said arm toward said target position after each iteration.

* * * * *